United States Patent
Ehara et al.

(10) Patent No.: US 10,965,211 B2
(45) Date of Patent: Mar. 30, 2021

(54) CONVERSION DEVICE AND HYBRID POWER SUPPLY SYSTEM

(71) Applicant: OMRON Corporation, Kyoto (JP)

(72) Inventors: Hirokazu Ehara, Kyoto (JP); Kazumi Tsuchimichi, Kyoto (JP); Kenji Kobayashi, Kyoto (JP); Yasuhiro Tsubota, Kyoto (JP)

(73) Assignee: OMRON Corporation, Kyoto (JP)

( * ) Notice: Subject to any disclaimer, the term of this patent is extended or adjusted under 35 U.S.C. 154(b) by 138 days.

(21) Appl. No.: 16/251,103

(22) Filed: Jan. 18, 2019

(65) Prior Publication Data

US 2019/0288600 A1 Sep. 19, 2019

(30) Foreign Application Priority Data

Mar. 13, 2018 (JP) .............................. JP2018-045392

(51) Int. Cl.
  *H02M 3/156* (2006.01)
  *H02M 7/537* (2006.01)
  *H02J 7/35* (2006.01)
(52) U.S. Cl.
  CPC ............... *H02M 3/156* (2013.01); *H02J 7/35* (2013.01); *H02M 7/537* (2013.01)
(58) Field of Classification Search
  CPC ................. H02M 3/156; H02M 7/537; H02M 2001/007; H02J 7/35; H02J 3/381; H02J 2300/24; H02J 3/383

(Continued)

(56) References Cited

U.S. PATENT DOCUMENTS

| 6,104,624 A | 8/2000 | Iwamoto et al. |
| 7,821,225 B2 * | 10/2010 | Chou ...................... H02J 9/061 320/103 |

(Continued)

FOREIGN PATENT DOCUMENTS

| WO | 2013018826 | 2/2013 |
| WO | 2014125602 | 8/2014 |

(Continued)

OTHER PUBLICATIONS

Nikkei Business Publications, Inc., ""Output decreases by about 70% in one year" What is PID?", Jan. 7 2016, with English translation thereof, Available at: https://tech.nikkeibp.co.jp/dm/atcl/feature/15/302961/010500010/? ST=msb.

(Continued)

*Primary Examiner* — M Baye Diao
(74) *Attorney, Agent, or Firm* — JCIPRNET

(57) ABSTRACT

A technology for suppressing a performance degradation of a solar battery caused by PID is provided. A conversion device includes a DC/DC converter and a control part. A solar battery is connected to an input end of the DC/DC converter. When direct-current power generated by the solar battery is converted and output, the DC/DC converter makes a potential of a negative electrode of the solar battery to be higher than a potential in a negative electrode of the output when the power input from the solar battery exceeds a prescribed value. The control part changes a voltage of the power output from the solar battery to detect a peak value of the power, and stops the operation of the DC/DC converter when the peak value is smaller than the prescribed value.

6 Claims, 11 Drawing Sheets

(58) Field of Classification Search
USPC .......................................................... 320/101
See application file for complete search history.

(56) References Cited

U.S. PATENT DOCUMENTS

| | | | | |
|---|---|---|---|---|
| 8,310,094 | B2* | 11/2012 | Yamada | H02J 3/381 |
| | | | | 307/46 |
| 8,614,903 | B2* | 12/2013 | Tsuchiya | H02J 3/381 |
| | | | | 363/97 |
| 8,952,672 | B2* | 2/2015 | Kernahan | H01L 31/02021 |
| | | | | 323/285 |
| 9,160,167 | B2* | 10/2015 | Koshin | H02J 1/10 |
| 9,209,639 | B2* | 12/2015 | Nishikawa | H01M 10/48 |
| 9,356,456 | B2* | 5/2016 | Fukada | H02J 7/35 |
| 9,391,460 | B2* | 7/2016 | Kuwahara | H02J 9/06 |
| 9,787,170 | B2* | 10/2017 | Inoue | H02M 7/48 |
| 10,239,417 | B2* | 3/2019 | Nagata | B60L 58/15 |
| 10,477,365 | B2* | 11/2019 | Kaneeda | H02J 7/35 |
| 2011/0210694 | A1* | 9/2011 | Uehashi | H02J 7/35 |
| | | | | 320/101 |
| 2018/0083547 | A1* | 3/2018 | Tsubota | H02J 3/383 |
| 2018/0337551 | A1* | 11/2018 | Park | H01L 31/02327 |
| 2019/0288600 | A1* | 9/2019 | Ehara | H02M 3/156 |

FOREIGN PATENT DOCUMENTS

| | | |
|---|---|---|
| WO | 2015015836 | 2/2015 |
| WO | 2016196759 | 12/2016 |
| WO | 2017047004 | 3/2017 |

OTHER PUBLICATIONS

"Office Action of Taiwan Counterpart Application," dated May 31, 2019, with English translation thereof, p. 1-p. 7.

* cited by examiner

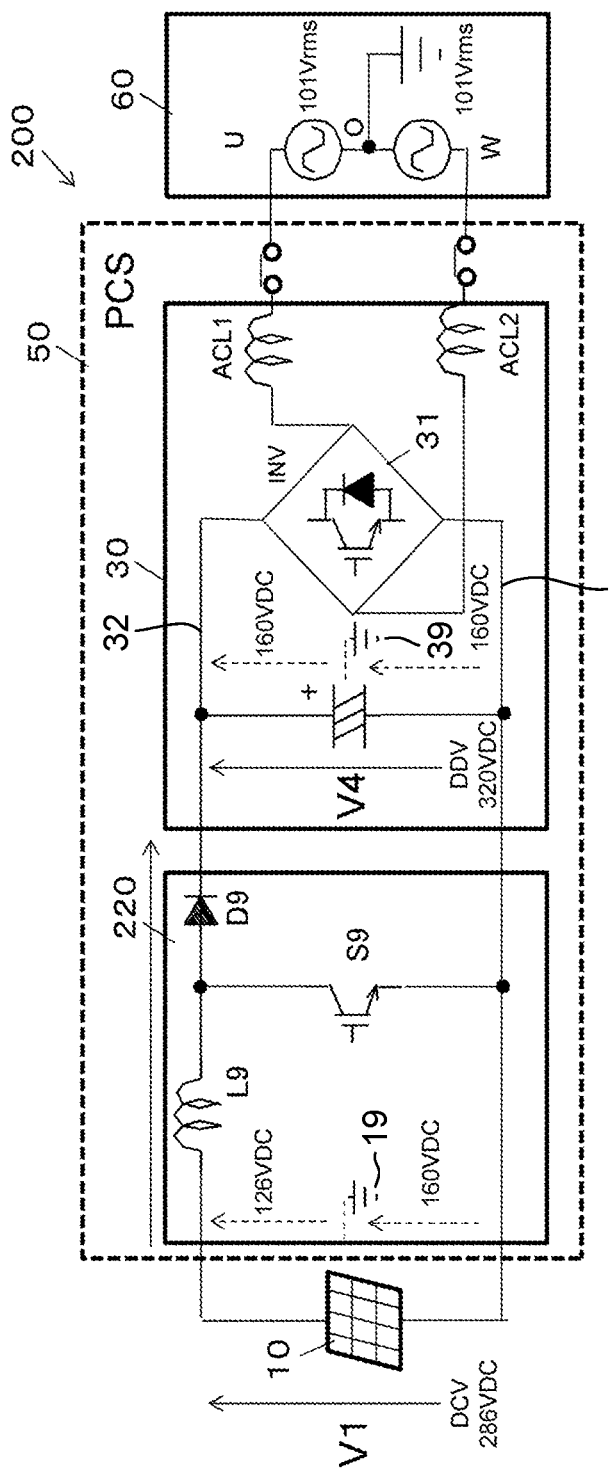
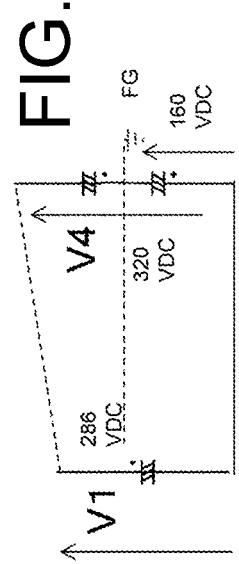
FIG. 2(A)
FIG. 2(B)

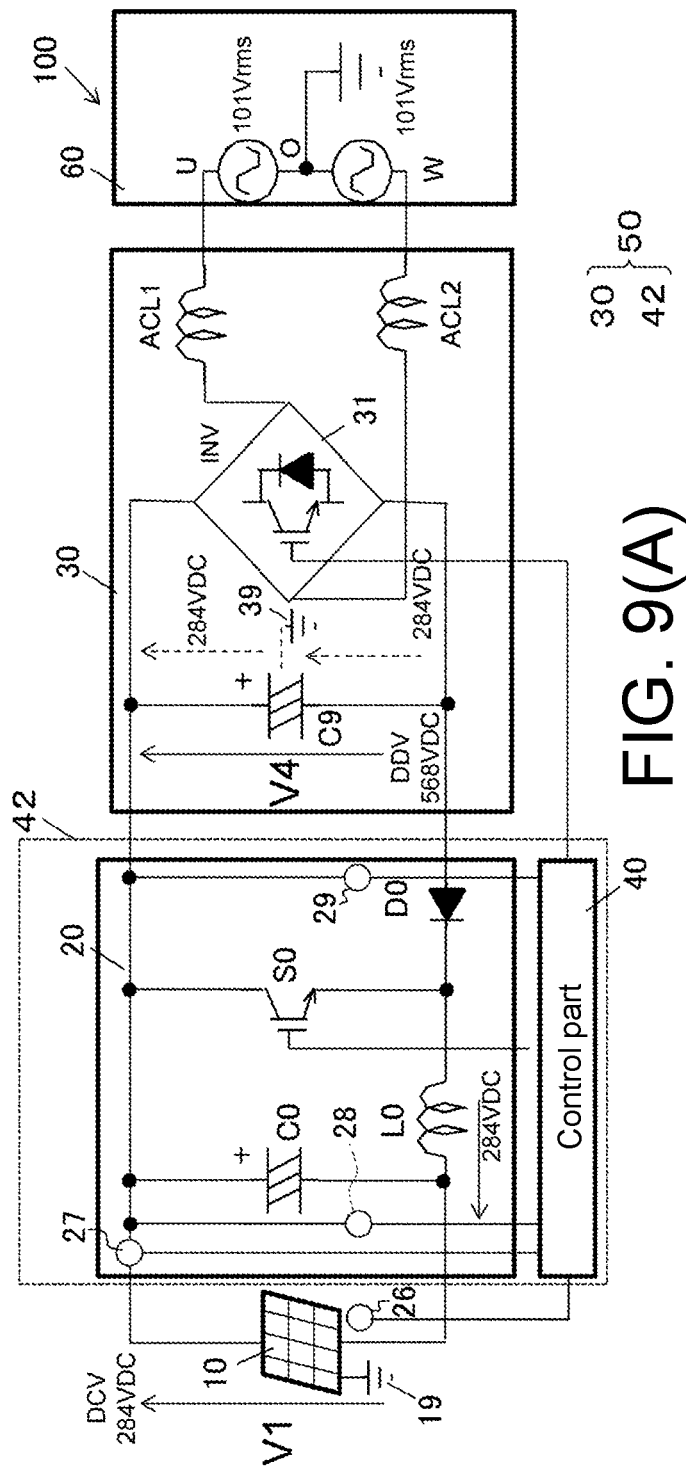
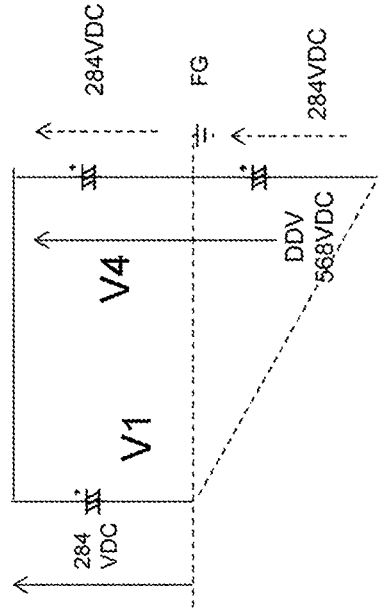
FIG. 9(A)
FIG. 9(B)

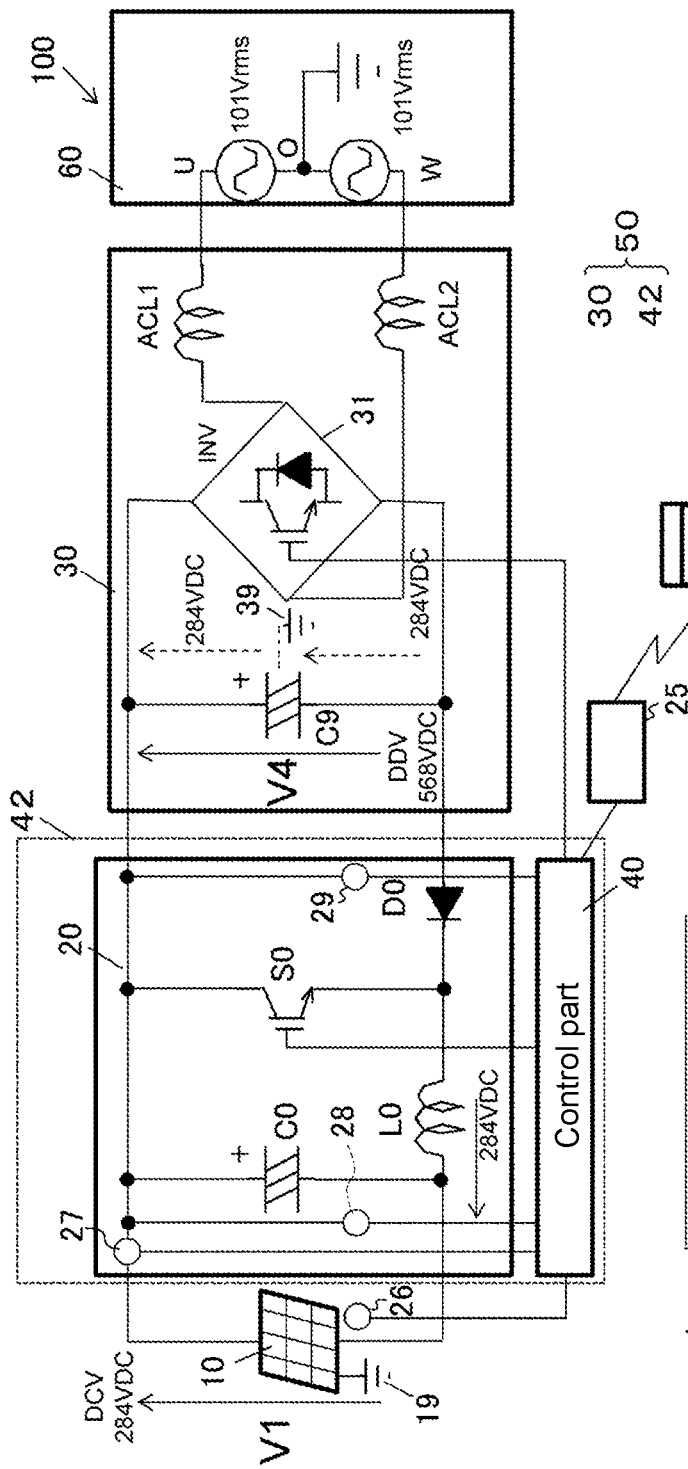
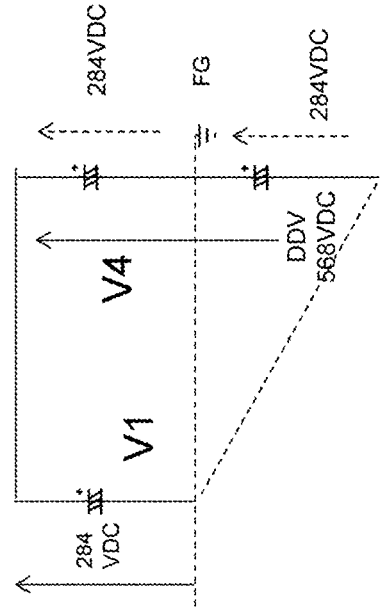
FIG. 10(A)
FIG. 10(B)

CONVERSION DEVICE AND HYBRID POWER SUPPLY SYSTEM

CROSS-REFERENCE TO RELATED APPLICATION

This application claims the priority benefit of Japan application serial no. 2018-045392, filed on Mar. 13, 2018. The entirety of the above-mentioned patent application is hereby incorporated by reference herein and made a part of this specification.

BACKGROUND

Technical Field

The present disclosure relates to a conversion device and a hybrid power supply system.

Related Art

In a solar power generation system which uses solar power to generate power, a solar battery is connected to a commercial power system or a load device via a power conditioner including an inverter and the like. The power generated by the solar battery is supplied to the commercial power system or the load device.

In recent years, because of high voltage of the solar power generation system is, and transformerless-type solar power generation systems with a highly efficient inverter are increased, consequently, there is an occasion that a large potential difference is generated between cells of the solar battery and a grounded frame. Then, it is known that due to the addition of external factors such as humidity, temperature (high temperature and high humidity) and the like, a leakage current is generated and a PID (Potential Induced Degradation) phenomenon is caused therefrom.

FIG. 11 is a diagram for schematically describing an example of the PID phenomenon. In FIG. 11, one of solar battery strings 1S which is provided in a solar battery 10 of the solar power generation system is schematically shown. The solar battery 10 includes a plurality of solar battery strings which are connected in parallel. The solar battery string 1S is formed by connecting a plurality of solar battery modules (solar battery panels) 1 in series and is connected to a commercial power system 45 via a power conditioner system (PCS). Each solar battery module 1 of the solar battery string 1S receives solar power to generate power in the daytime, and thus a potential difference is generated between an input terminal 311 on a positive side and an input terminal 312 on a negative side.

FIG. 12 is a drawing schematically showing a structure of the solar battery module 1. As shown in FIG. 12, the solar battery module 1 has a frame 11, a back seat 12, a cell 13, a glass 14, and a sealing material 15.

The cell 13 is an element including a semiconductor layer (power generation layer) which converts light energy to power by a photovoltaic effect. The glass 14 is arranged on a light-receiving surface side of the cell 13, the back seat 12 is arranged on a non-light-receiving surface side of the cell 13, and the sealing material 15 is filled between the glass 14, the back seat 12 and the cell 13 to seal the cell 13. The frame 11 is arranged on an outer periphery of the solar battery module 1, and is used as a fixing member which is fixed to a support base and the like when the solar battery module 1 is arranged. In addition, the frame 11 is a conductive metal and is grounded.

As shown in FIG. 11, the potential (referred to the ground potential) of the cell 13 of each solar battery module 1 connected in series is positive in the solar battery module 1 on the input terminal 311 side, and is negative in the solar battery module 1 on the input terminal 312 side. When the difference of the potential is increased, and as shown by a dashed arrow in FIG. 12, a leakage current is generated between the cell 13 and the frame 11 of the solar battery module 1 or between moisture 91 adhered to the glass surface and the cell 13, sodium ions of the glass 14 or the like may migrate to the cell 13 and inhibit a movement of electrons of the cell 13, and a performance degradation of the cell 13, that is, the PID phenomenon is caused.

LITERATURE OF RELATED ART

Non-Patent Literature

[Non-patent literature 1] Mega-Solar-Business/Trouble/, Nikkei Business Publications, Inc., [Searched on Sep. 13, 2016], Internet <http://techon.nikkeibp.co.jp/atcl/feature/15/302961/010500010/?ST=msb&P=1>

A performance degradation caused by PID becomes more remarkable if the potential of the solar battery module 1 is increased, and thus problems caused by the PID are also increased along with higher voltage of the solar battery system in recent years.

However, it is known that even when the PID occurs and performance of the solar battery module is degraded, the performance degradation of each solar battery module is gradually recovered when power generation of the solar battery module is stopped at night and the potential is reduced. Therefore, in the solar battery system in which the potential disappears at night, the performance degradation caused by the PID can be suppressed.

However, it is known that even when the PID occurs and performance of the solar battery module is degraded, the performance degradation of each solar battery module is gradually recovered when power generation of the solar battery module is stopped at night and the potential is reduced. Meanwhile, there is a problem that the recovery at night is slow and thus the recovery is not always sufficient. In addition, in a hybrid power system provided with a storage battery in addition to the solar battery, charge and discharge of the storage battery are performed even at night and the potential of the solar battery module is not reduced, and thus the performance degradation of the solar battery module caused by the PID becomes a problem.

SUMMARY

Problems to be Solved

That is, a conversion device of one example of the disclosure includes: a DC/DC converter, in which a solar battery is connected to an input end, wherein when direct-current power generated by the solar battery is converted and output, the DC/DC converter makes a potential of a negative electrode of the solar battery higher than a potential in a negative electrode of the output when the power input from the solar battery exceeds a prescribed value; and a control part, which changes a voltage of the power output from the solar battery to detect a peak value of the power and stops the operation of the DC/DC converter when the peak value is smaller than the prescribed value.

Accordingly, when a power value output from the solar battery is low and the potential of the negative electrode of the solar battery cannot be higher than the potential of the negative electrode on the output side of the DC/DC converter, the conversion device can prevent an occurrence of the performance degradation caused by the PID by stopping the operation of the DC/DC converter.

In addition, a conversion device of one example of the disclosure includes: a DC/DC converter, in which a solar battery is connected to an input end, wherein when direct-current power generated by the solar battery is converted and output, the DC/DC converter makes a potential of a negative electrode of the solar battery higher than a potential in a negative electrode of the output when voltage of the power input from the solar battery exceeds a prescribed value; and a control part, which changes the voltage of the power output from the solar battery to detect a peak point of the power, and stops the operation of the DC/DC converter when the voltage at the peak point is smaller than the prescribed value.

Accordingly, when the power value output from the solar battery is low and the potential of the negative electrode of the solar battery cannot be higher than the potential of the negative electrode on the output side of the DC/DC converter, the conversion device can prevent the occurrence of the performance degradation caused by the PID by stopping the operation of the DC/DC converter.

In addition, a conversion device of one example of the disclosure includes: a DC/DC converter, in which a solar battery is connected to an input end, wherein when direct-current power generated by the solar battery is converted and output, the DC/DC converter makes a potential of a negative electrode of the solar battery higher than a potential in a negative electrode of the output when the power input from the solar battery exceeds a prescribed value; and a control part, which acquires information indicating weather or illumination and stops the operation of the DC/DC converter when the power from the solar battery estimated based on the information is smaller than the prescribed value.

Accordingly, when the potential of the negative electrode of the solar battery cannot be higher than the potential of the negative electrode on the output side of the DC/DC converter due to bad weather or low illumination, the conversion device can prevent the occurrence of the performance degradation caused by the PID by stopping the operation of the DC/DC converter.

In addition, a hybrid power supply system of one example of the disclosure is provided with: a solar battery; a conversion device connected to the solar battery; and a power storage device including a storage battery connected to an output of the conversion device.

Accordingly, in the hybrid power system in which the voltage on the output side of the DC/DC converter is kept high by the power storage device even when the output of the solar battery is low, when the potential of the negative electrode of the solar battery cannot be higher than the potential of the negative electrode on the output side of the DC/DC converter, the occurrence of the performance degradation caused by the PID can be prevented by stopping the operation of the DC/DC converter.

Effect

According to the present disclosure, the performance degradation of the solar battery caused by PID can be suppressed.

BRIEF DESCRIPTION OF THE DRAWINGS

FIG. 2(A) is a drawing showing a circuit configuration of a DC/DC converter and an inverter unit provided on a solar power generation system which is used as a comparison example, and FIG. 2(B) a diagram schematically showing an output voltage of the solar battery and a voltage between the positive electrode and the negative electrode of the inverter unit.

FIG. 9(A) is a drawing showing a configuration example (2.6) of the solar power generation system, and FIG. 9(B) a diagram schematically showing an output voltage of the solar battery and a voltage in the configuration example (2.6) of the solar power generation system.

FIG. 10(A) is a drawing showing a configuration example (2.7) of the solar power generation system, and FIG. 10(B) a diagram schematically showing an output voltage of the solar battery and a voltage in the configuration example (2.7) of the solar power generation system.

DESCRIPTION OF THE EMBODIMENTS

In the following, an embodiment of one aspect of the present disclosure (also referred to as "embodiment" hereinafter) is described based on the drawings.

§ 1 Application Example

Figure 1A:
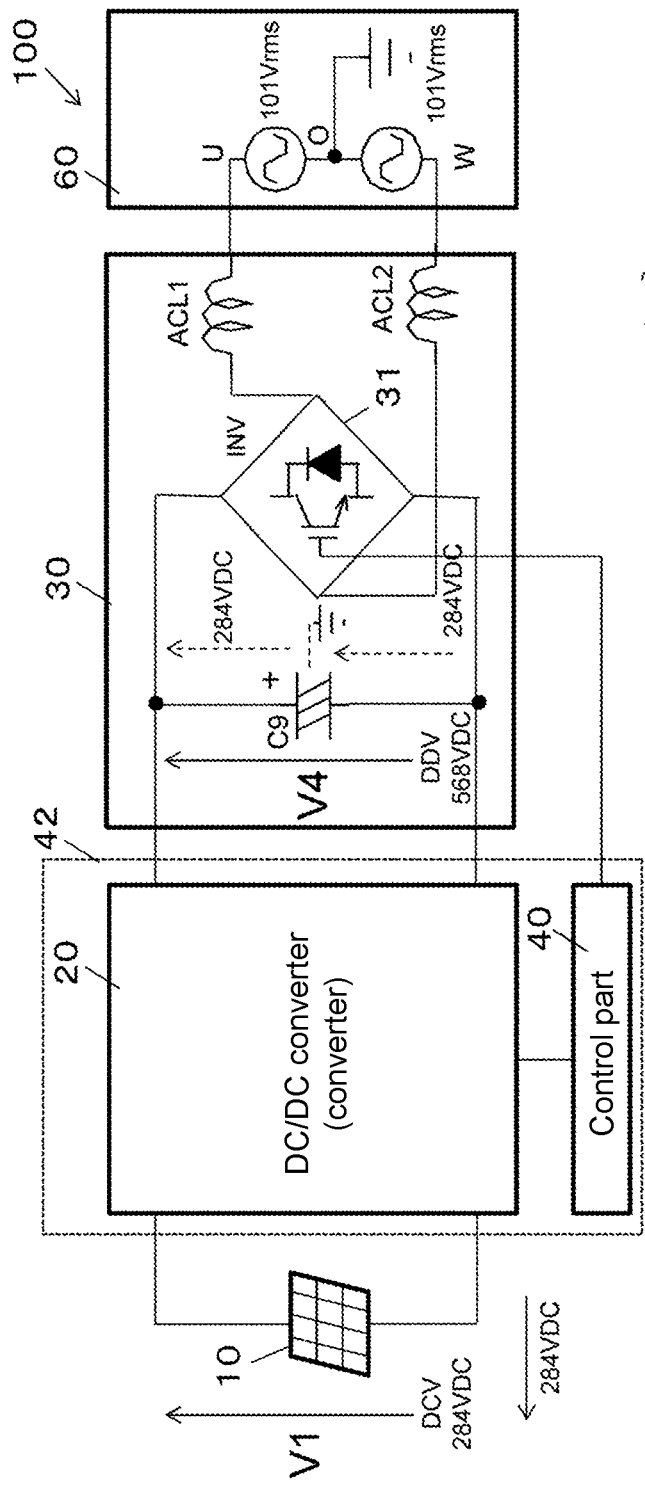
FIG. 1(A) is a block diagram showing a configuration of a solar power generation system of an embodiment, and FIG. 1(B) a diagram schematically showing an output voltage of the solar battery and a voltage between the positive electrode and the negative electrode of the inverter unit.
Figure 1B:
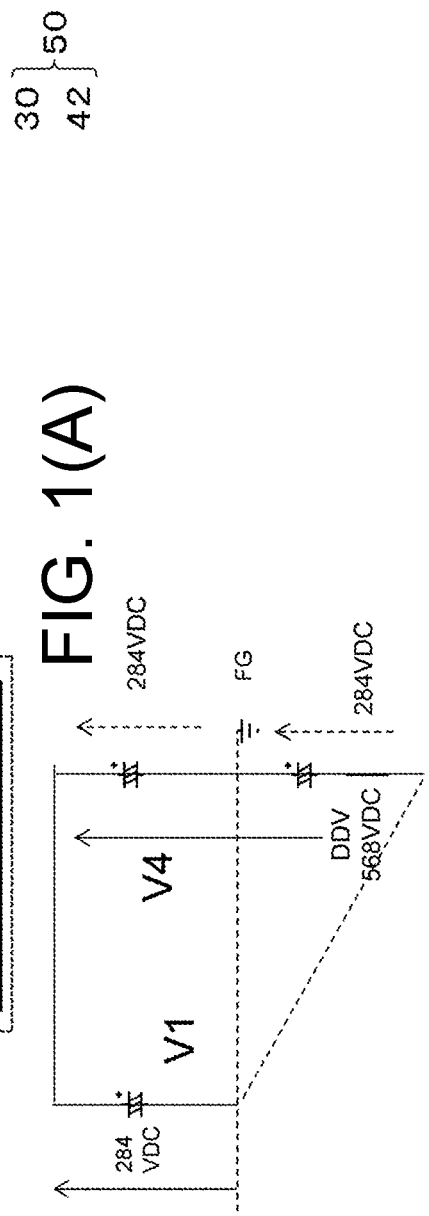
Figure 3:
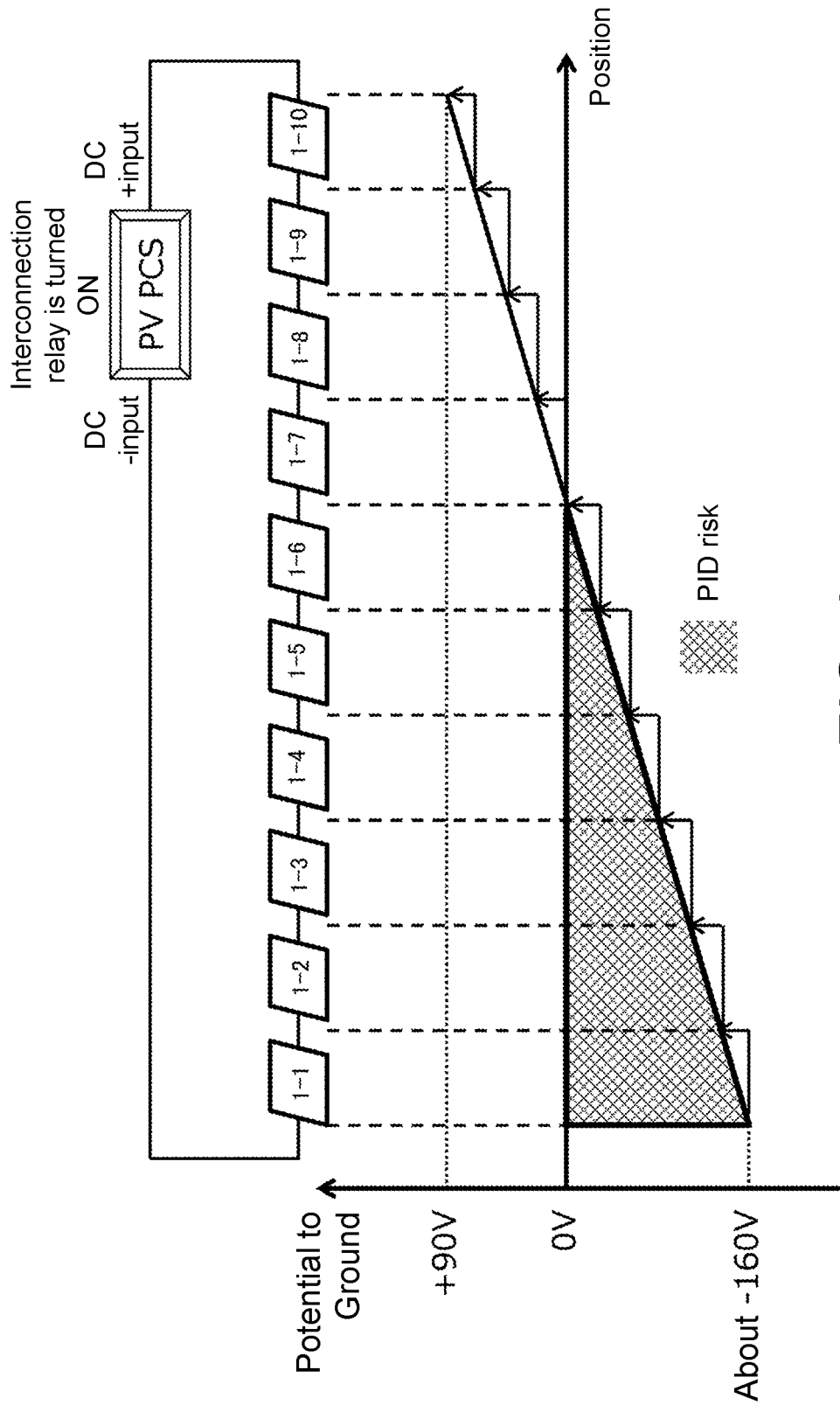
FIG. 3 is a drawing showing a potential in the comparison example.
Figure 4:
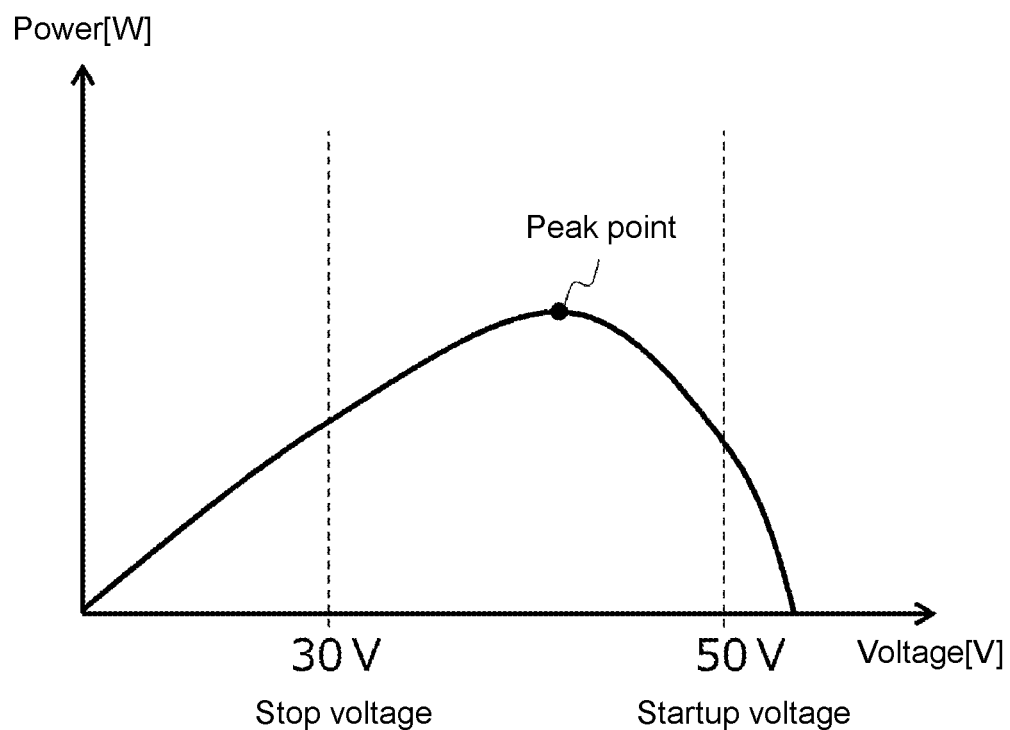
FIG. 4 is a graph showing a state of changes of a P-V curve in a process in which the solar power generation system is started up.

FIG. 1(A) a block diagram showing a configuration of a solar power generation system 100 of the embodiment. FIG. 1(B) a diagram schematically showing an output voltage of the solar battery and a voltage between the positive electrode and the negative electrode of the inverter unit. FIG. 2(A) is a drawing schematically showing circuit configurations of a DC/DC converter 220 and an inverter unit 30 provided on a solar power generation system 200 which is used as a comparison example. FIG. 2(B) a diagram schematically showing an output voltage of the solar battery and a voltage between the positive electrode and the negative electrode of the inverter unit. FIG. 3 is a drawing showing a potential (referred to the ground potential) in the comparison example. FIG. 4 is a drawing showing a state of changes of a P-V curve in a process in which the solar power generation system 100 is started up. The potential means the potential referred to the ground potential.

In the example of FIG. 1(A), the solar power generation system 100 is provided with a solar battery 10, a DC/DC converter 20, an inverter unit 30 and a control part 40, and is connected to a commercial power system or a load device via a distribution board 60. The DC/DC converter 20 and the control part 40 constitute a conversion device 42 of the example. In addition, the inverter unit 30 and the conversion device 42 constitute a power conditioner of the example.

The illumination to the solar battery 10 is low at night and the solar power generation system 100 is stopped. When illumination with respect to the solar battery 10 increases and the power input to the DC/DC converter 20 reaches a reference value from the aforesaid state, the control part 40 causes the DC/DC converter 20 to start a conversion of the power from the solar battery 10, and direct-current power is converted to alternating-current power and output by the inverter unit 30.

The control part 40 controls by a MPPT (Maximum Power Point Tracking) method so that the maximum power is output from the solar battery 10 after starting the operation. For example, when the DC/DC converter 20 is operated and the voltage is changed, a power value is changed as shown in FIG. 4, and thus the control part 40 controls in a manner by following a peak point of the power value, where the peak point of the power value is obtained by a hill-climbing method.

Figure 12:
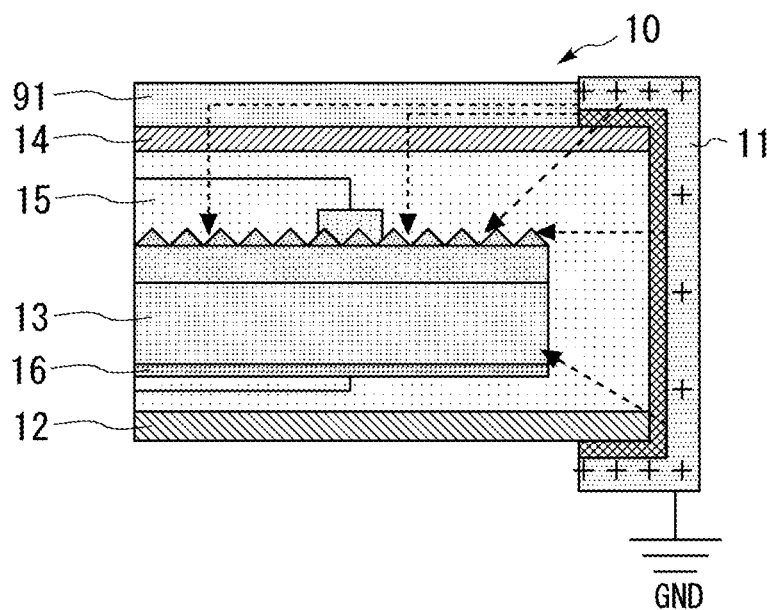
FIG. 12 is a drawing schematically showing a structure of a solar battery module 1.

The solar battery 10 is provided with a plurality of solar battery strings 1S which are connected in parallel, and the solar battery string 1S is provided with a plurality of solar battery modules 1 which are connected in series. Each solar battery module 1 is a module in which solar energy is converted to electric energy by a photovoltaic effect and is output as direct-current power. The solar battery module 1 is, for example, a known configuration shown in FIG. 12 which is a configuration in which a panel for sealing a cell 13 between a glass 14 and a back seat 12 is kept in a frame 11. Besides, one cell 13 is schematically shown in FIG. 12, but a plurality of cells 13 are arranged in the solar battery module 1 and are connected in series by an electrode pattern 16, and the plurality of cells 13 connected in series are further connected in parallel. These cells 13 are connected to an output terminal (not shown) of the solar battery module 1, and power generated in each cell 13 is output from the output terminal. The frame 11 is grounded separately from internal circuits of these cells 13 or the like, and there is a potential difference (potentials referred to the ground potential) between the cells 13 and the frame 11 or the like.

The DC/DC converter 20 converts an output from the solar battery 10 and the converted output from the DC/DC converter 20 is output to the inverter unit 30.

The inverter unit 30 is provided with an inverter by which the direct-current power from the DC/DC converter 20 is converted to alternating-current power and is supplied to the commercial power system or the load device. In addition, the inverter unit 30 is provided with a system interconnection relay or the like, and controls a connection to or a disconnection from the commercial power system (system interconnection).

In the example of FIG. 2(A), the solar power generation system 200 is provided with the solar battery 10, the DC/DC converter 220 and the inverter unit 30, and is connected to the commercial power system or the load device via a distribution board 60.

The DC/DC converter 220 is a non-insulated boost (step-up) circuit including a reactor L9, a switching element S9 for step-up and a diode D9. One end of the reactor L9 is connected to the positive electrode of the solar battery 10, and the other end of the reactor L9 is connected to an anode of the diode D9 and is also connected to one end on the high potential side of the switching element S9. The anode of the diode D9 is connected to the reactor L9 and one end on the high potential side of the switching element S9, and a cathode of the diode D9 is connected to the positive electrode on the output side of the DC/DC converter 220. The switching element S9 is connected in parallel to the solar battery 10, and one end on the low potential side of the switching element S9 is connected to the negative electrode of the solar battery 10 and is also connected to the negative electrode on the output side of the DC/DC converter 220.

In the solar power generation system 200 of the comparison example, the reactor L9 and the diode D9 in the DC/DC converter 220 are connected to the positive electrode side, the negative electrode side of the DC/DC converter 220 is commonly used and this negative electrode is connected to the negative electrodes of the solar battery 10 and the inverter unit 30. Accordingly, the potential of the negative electrode in the solar battery 10 is the same as the potential of the negative electrode of the inverter unit 30. Therefore, for example, as shown in FIG. 2(A) and FIG. 2(B), when the voltage between a positive electrode 32 and a negative electrode 33 on the direct-current side of the inverter unit 30 is 320 V and the potential of the negative electrode 33 with respect to earth 39 is −160 V, the potential of the negative electrode of the solar battery 10 is −160 V with respect to the earth 19. Then, when the solar battery 10 generates power and the voltage between the positive electrode and the negative electrode is 284 V, the potential of the positive electrode is +124 V. At this time, when the solar battery strings 1S of the solar battery 10 are configured by the solar battery modules 1-1 to 1-10 as shown in FIG. 3 for example, the solar battery modules 1-1 to 1-6 on the negative electrode side (a shaded part of FIG. 3) has a negative potential, and a risk of performance degradation caused by the PID is generated.

Therefore, in the solar power generation system 100 of the embodiment, the DC/DC converter 20 makes the potential of the negative electrode of the solar battery 10 become higher than the potential of the negative electrode of the inverter 31 when outputting the direct-current voltage generated by the solar battery to the inverter side without commonly using the negative electrode of the solar battery 10 and the negative electrode of the inverter 31. Accordingly, the potential of the solar battery module 1 located on the negative electrode side of the solar battery 10 is prevented from being negative, and the performance deterioration of the solar battery 10 caused by the PID is suppressed. For example, the potential of the negative electrode of the solar battery 10 is set to be higher than 0 V, thereby preventing the performance deterioration of the solar battery 10 caused by the PID. In the example of FIG. 1(B), an output voltage V1 of the solar battery (for example, 284 V) is stepped up by the DC/DC converter 20 and is applied between the positive electrode and the negative electrode of the inverter unit 30, and a voltage V4 between the positive electrode and the negative electrode of the inverter unit 30, that is, the voltage between the positive electrode and the negative electrode of the inverter 31 is set to 568 V. In this case, the potential in the middle of the positive electrode and the negative electrode of the inverter unit 30 is 0 V, and thus the potential of the positive electrode is +284 V and the potential of the negative electrode is −284 V. Besides, the DC/DC converter 20 commonly uses the positive electrode of the solar battery 10 and the positive electrode of the inverter unit 30 to equalize the potentials, and sets the potential of the positive electrode of the solar battery 10 to +284 V. Therefore, the potential of the negative electrode of the solar battery 10 is 0 V when the voltage between the positive electrode and the negative electrode is 284 V, and the performance deterioration of the solar battery 10 caused by the PID is prevented.

However, when the output from the solar battery 10 is low, for example, immediately after starting up or on a cloudy day, the potential of the negative electrode of the solar battery 10 may not be higher than 0 V. Therefore, if the operation is continued in a state that the output from the solar battery 10 is low, the risk of performance degradation caused by the PID is generated.

Therefore, in the solar power generation system 100 of the embodiment, when the output from the solar battery 10 is low and the potential of the negative electrode of the solar battery 10 cannot be higher than 0 V, for example, when the voltage in the peak point in the control by a MPPT method is smaller than a prescribed value, when a peak power is smaller than a prescribed value, and when weather and illumination meets an occurrence condition of PID, the operation of the DC/DC converter is stopped.

Accordingly, in the solar power generation system 100 of the embodiment, the performance degradation caused by the PID in the state that the output of the solar battery 10 is low can be prevented.

§ 2 Configuration Example (2.1)

Figure 5A:
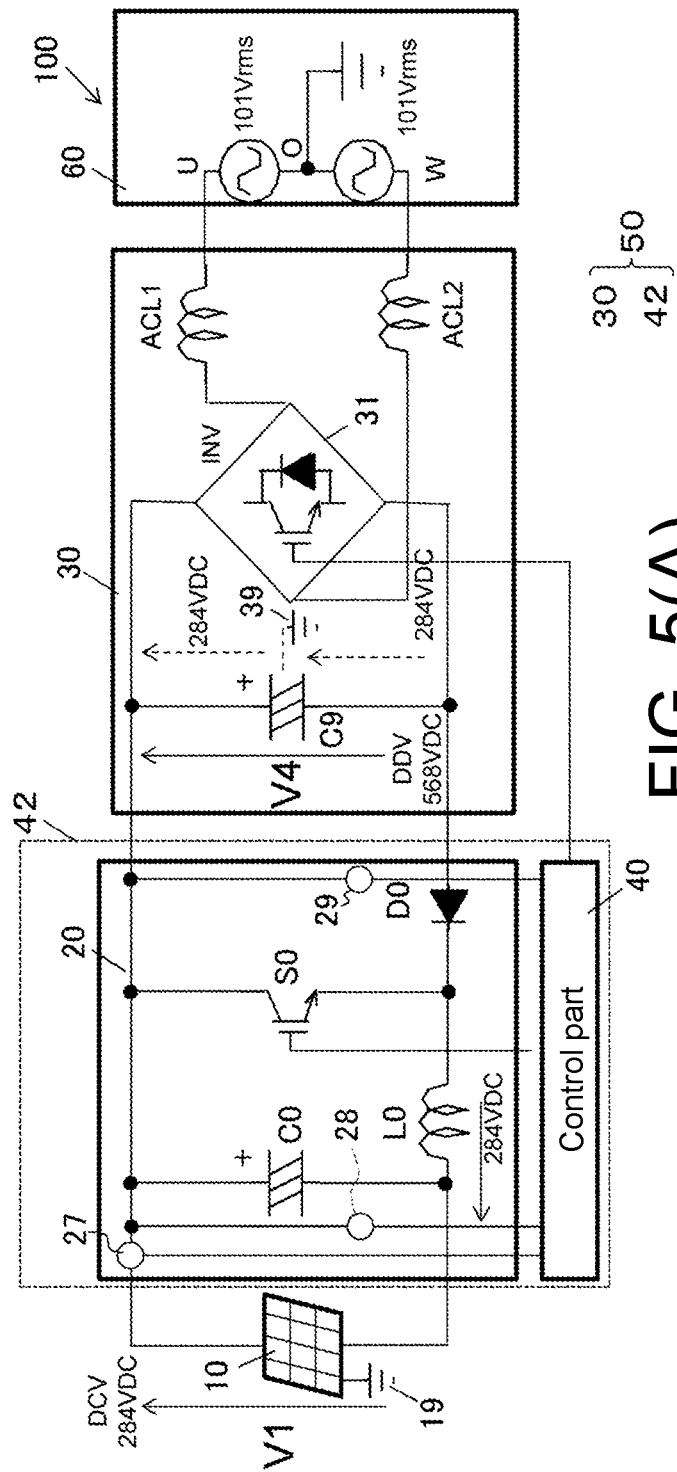
FIG. 5(A) is a drawing showing a configuration example (2.1) of the solar power generation system, and FIG. 5(B) a diagram schematically showing an output voltage of the solar battery and a voltage between the positive electrode and the negative electrode of the inverter unit.
Figure 5B:
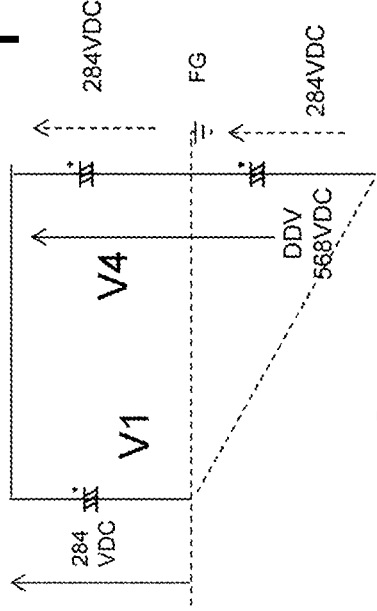

FIG. 5(A) is a drawing showing a configuration example (2.1) of the solar power generation system 100. FIG. 5(B) a diagram schematically showing an output voltage of the solar battery and a voltage between the positive electrode and the negative electrode of the inverter unit. Besides, elements having the same function as the above-described FIG. 1(A) are denoted by the same symbols and the like, and repeated description is omitted.

In the example of FIG. 5(A), the DC/DC converter 20 connected to the solar battery 10 is a non-insulated boost (step-up) circuit which has a reactor L0, a switching element S0 for step-up, a diode D0, a capacitor C0, an input current detector 27, an input voltage detector 28, and an output voltage detector 29.

One end of the reactor L0 is connected to the negative electrode of the solar battery 10, and the other end of the reactor L0 is connected to a cathode of the diode D0 and is also connected to one end on the low potential side of the switching element S0.

The cathode of the diode D0 is connected to the reactor L0 and is also connected to one end on the low potential side of the switching element S0, and the anode of the diode D0 is connected to the negative electrode of the output end of the DC/DC converter 20. That is, the reactor L0 and the diode D0 are connected in series in a negative electrode side line of the DC/DC converter 20.

One end on the high potential side of the switching element S0 is connected to the positive electrode of the solar battery 10 and the positive electrode of the inverter 31, and one end on the low potential side of the switching element S0 is connected to the cathode of the diode D0 and an end part on the inverter 31 side of the reactor L0.

The switching element S0 may be, for example, a switch element such as a MOS (metal-oxide-semiconductor) field-effect transistor, an insulated gate bipolar transistor (IGBT) and the like. The switching element S0 performs a switching operation by a drive circuit (not shown), and cyclically connects/disconnects between one end on the high potential side (a drain terminal in the example) and one end on the low potential side (a source terminal in the example).

The capacitor C0 is connected in parallel to the solar battery 10 between the positive electrode and the negative electrode on the input side of the DC/DC converter 20. The output of the DC/DC converter 20 is stepped up and smoothed by the switching operation of the switching element S0.

By the switching operation of the switching element S0, the DC/DC converter 20 steps up the direct-current voltage (for example, 284 V) input from the solar battery 10 to, for example, a prescribed voltage (for example, 564 V) and outputs the voltage to the inverter unit 30.

The inverter unit 30 includes a capacitor C9, an inverter 31, and AC reactors ACL1, ACL2.

The capacitor C9 is a filter circuit which is connected between the positive electrode and the negative electrode on the direct-current side of the inverter unit 30 and which smoothes noise components of the direct-current voltage that is input via the DC/DC converter 20.

The inverter 31 converts the direct-current power from the solar battery 10 to the alternating-current power, and outputs the power via the AC reactors ACL1, ACL2.

The input current detector 27 detects an electric current input from the solar battery 10 to the DC/DC converter 20. The input voltage detector 28 is connected between the positive electrode and the negative electrode of the solar battery 10, and detects a voltage value of the power input to the DC/DC converter 20, that is, the voltage (input voltage) applied to the input end of the DC/DC converter 20. The output voltage detector 29 is connected between the positive electrode and the negative electrode on the output side of the DC/DC converter 20, and detects the voltage of the power output from the DC/DC converter 20.

When the voltage value detected by the input voltage detector 28 exceeds a prescribed startup voltage value (for example, 50 V), the control part 40 starts the switching operation of the switching element S0, that is, the operation of the DC/DC converter 20, and performs the MPPT method to control the switching operation.

In the example of FIG. 5(B), the voltage V1 (for example, 284 V) between the positive electrode and the negative electrode of the solar battery 10 is stepped up by the DC/DC converter 20 and is applied between the positive electrode and the negative electrode of the inverter unit 30, and the voltage V4 between the positive electrode and the negative electrode of the inverter unit 30 is set to 568 V. In this case, the potential in the middle of the positive electrode and the negative electrode of the inverter unit 30 is 0 V, and thus the potential (hereafter, referred to the ground potential) of the positive electrode is +284 V and the potential of the negative electrode is −284 V. In addition, the DC/DC converter 20 commonly uses the positive electrode of the solar battery 10 and the positive electrode of the inverter unit 30 to equalize the potentials, and sets the potential of the positive electrode of the solar battery 10 to +284 V. Therefore, the potential of the negative electrode of the solar battery 10 is 0 V when the voltage between the positive electrode and the negative electrode is 284 V, and the performance degradation of the solar battery 10 caused by the PID is prevented. In the example, the potential of the negative electrode in the solar battery 10 is set to 0 V, but the potential may be higher than 0 V when a polycrystalline silicon (Poly-silicon) solar cell is adopted. Besides, when a thin film silicon solar cell is adopted, a peeling of thin film may occur if the potential of the negative electrode in the solar battery 10 is too high, and thus it is desirable that the potential of the negative electrode in the solar battery 10 is set to 0 V. However, the potential in this case is not strictly limited to 0 V, and may be lower than 0 V to a degree that the PID does not occur or may exceed 0 V to a degree that the peeling of thin film does not occur.

Furthermore, in the case that the output voltage V1 of the solar battery 10 is lower than a prescribed value (for example, 284 V) in the peak point when the MPPT control is controlled, such as immediately after starting or on a cloudy day, the control part 40 stops the switching operation of the switching element S0, that is, the operation of the DC/DC converter 20. Accordingly, when the output voltage V1 of the solar battery 10 is low and the potential of the negative electrode of the solar battery 10 cannot be higher than the potential of the negative electrode on the output side of the DC/DC converter 20, that is, cannot be higher than 0 V, the occurrence of the performance degradation caused by the PID can be prevented by stopping the operation of the DC/DC converter 20. Besides, the prescribed value is not strictly limited to a value for which the potential of the negative electrode of the solar battery 10 can be higher than 0 V, and may be determined to a value lower than 0 V to a degree that the PID does not occur.

(2.2)

Figures 6A, 6B:
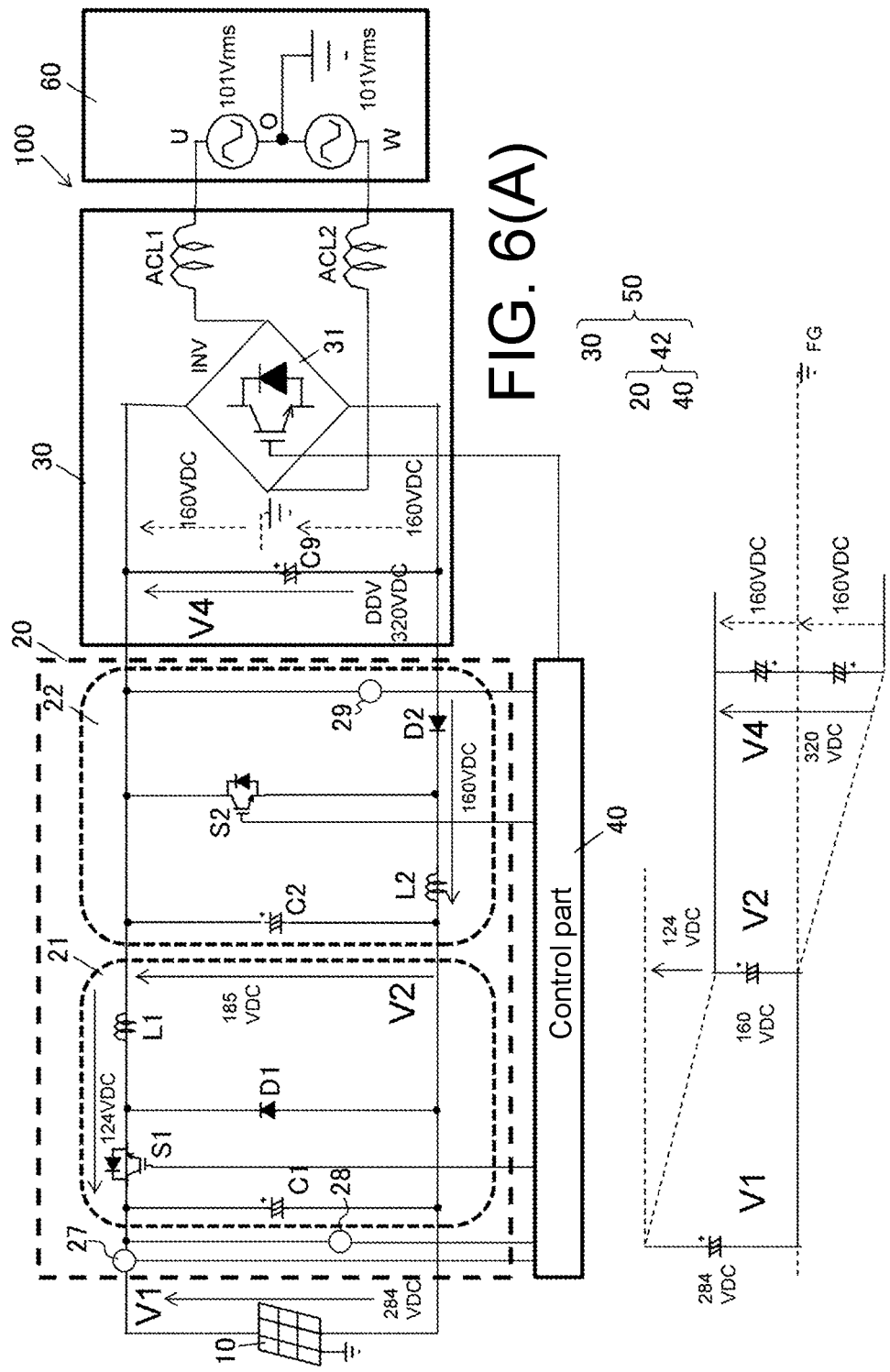
FIG. 6(A) is a drawing showing a configuration example (2.2) of the solar power generation system, and FIG. 6(B) a diagram schematically showing an output voltage of the solar battery and voltages in the configuration example (2.2) of the solar power generation system.

FIG. 6(A) is a drawing showing a configuration example (2.2) of the solar power generation system 100. FIG. 6(B) a diagram schematically showing an output voltage of the solar battery and voltages in the configuration example (2.2) of the solar power generation system. Besides, elements having the same function as the above-described solar power generation system 100 are denoted by the same symbols and the like, and repeated description is omitted.

In the example of FIG. 6(A), the DC/DC converter 20 is provided with a first conversion part 21 and a second conversion part 22. The first conversion part 21 is a non-insulated step-down (bulk) circuit including a reactor L1, a switching element S1, a diode D1, and a capacitor C1.

One end of the reactor L1 is connected to the positive electrode of the inverter 31, and the other end of the reactor L1 is connected to a cathode of the diode D1 and one end on the inverter side of the switching element S1.

The cathode of the diode D1 is connected to the reactor L1 and one end on the inverter side of the switching element S1, and an anode of the diode D1 is connected to the negative electrode of the solar battery 10.

One end (for example, a drain) of the switching element S1 is connected to the positive electrode of the solar battery 10, and the other end (for example, a source) of the switching element S1 is connected to the cathode of the diode D1 and an end part on the solar battery side of the reactor L1.

The capacitor C1 is connected in parallel to the solar battery 10 between the positive electrode and the negative electrode on the input side of the first conversion part 21, and smoothes an output of the first conversion part 21 by a switching operation of the switching element S1.

The second conversion part 22 is a non-insulated step-up circuit including a reactor L2, a switching element S2, a diode D2, and a capacitor C2.

One end of the reactor L2 is connected to the negative electrode of the solar battery 10, and the other end of the reactor L2 is connected to a cathode of the diode D2 and one end on the low potential side of the switching element S2.

The cathode of the diode D2 is connected to the reactor L2 and one end on the low potential side of the switching element S2, and an anode of the diode D2 is connected to the negative electrode of the output end of the DC/DC converter 20. That is, the reactor L2 and the diode D2 are connected in series in the negative electrode side line of the DC/DC converter 20.

One end on the high potential side of the switching element S2 is connected to the positive electrode of the first conversion part 21 and the positive electrode of the inverter 31, and one end on the low potential side of the switching element S2 is connected to the cathode of the diode D2 and an end part on the inverter 31 side of the reactor L2.

The capacitor C2 is connected between the positive electrode and the negative electrode of the solar battery side of the second conversion part 22, that is, one end is connected to an end part on the positive electrode side of the switching element S2 and the other end is connected to an end part on the solar battery side of the reactor L2, and the capacitor C2 smoothes the output of the second conversion part 22 which is stepped up by the switching operation.

In the DC/DC converter 20 of the example, as shown in FIG. 6(B), the first conversion part 21 commonly uses the negative electrode and steps down the output voltage V1 (for example, 284 V) of the solar battery 10 to a prescribed voltage V2. Then, the second conversion part 22 commonly uses the positive electrode and steps up the voltage V2 to 2 times the voltage V4 (for example, 320 V). Accordingly, in the solar power generation system 100 of the example, the potential of the negative electrode in the solar battery 10 is set to 0 V.

In addition, when the output voltage V1 of the solar battery 10 is smaller than a prescribed value, for example, smaller than one half (½) of the voltage (160 V in the example of FIG. 6(B)) between the positive electrode and the negative electrode of the inverter 31 in the peak point when the MPPT method is performed, the control part 40 stops the switching operation of the switching element S0, that is, stops the operation of the DC/DC converter 20. Accordingly, when the output voltage V1 of the solar battery 10 is low and the potential of the negative electrode of the solar battery 10 cannot be higher than the potential of the negative electrode on the output side of the DC/DC converter 20, the occurrence of the performance degradation caused by the PID can be prevented by stopping the operation of the DC/DC converter 20.

(2.3)

Figures 7A, 7B:
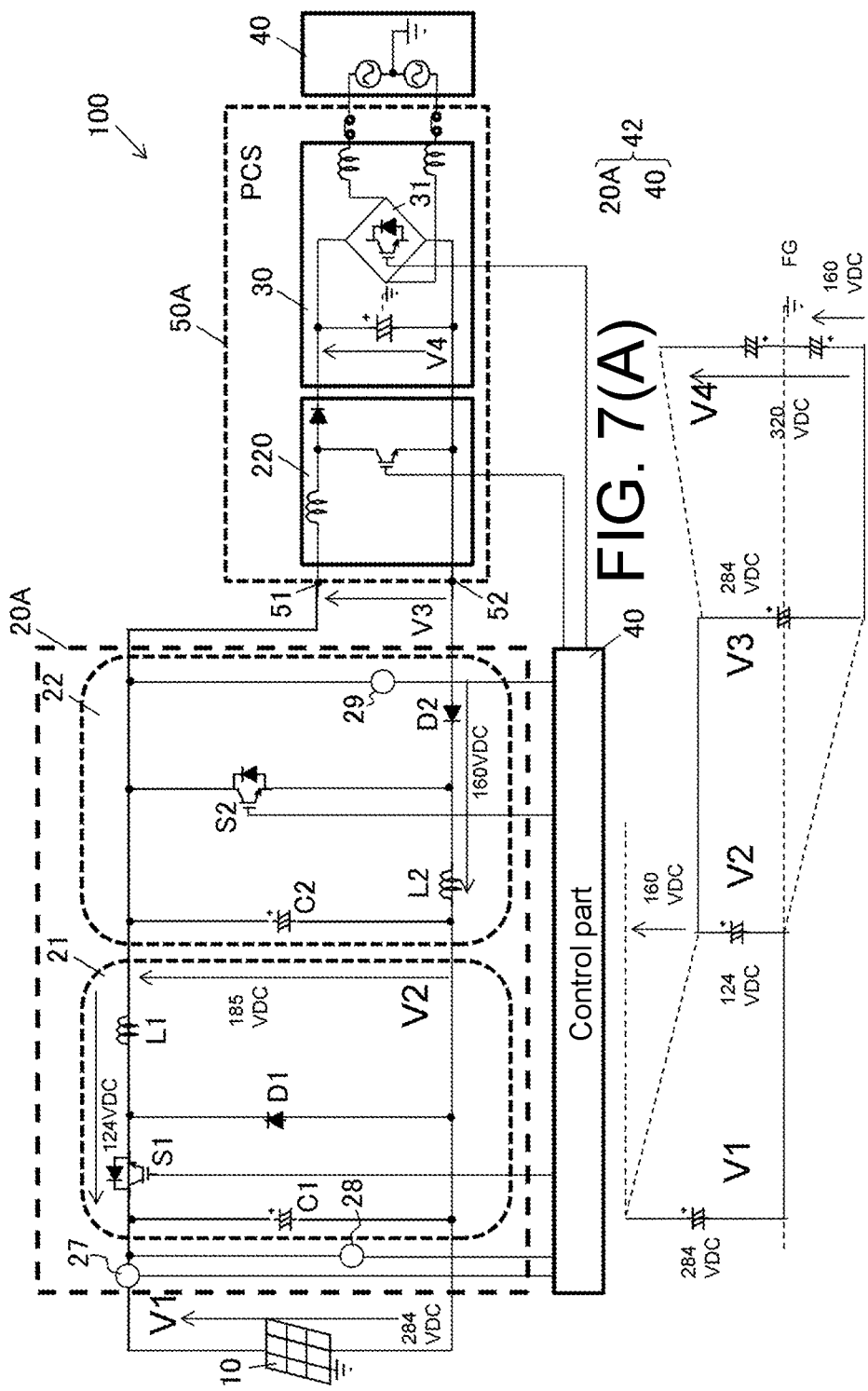
FIG. 7(A) is a drawing showing a configuration example (2.3) of the solar power generation system, and FIG. 7(B) a diagram schematically showing an output voltage of the solar battery and voltages in the configuration example (2.3) of the solar power generation system.

FIG. 7A is a drawing showing a configuration example (2.3) of the solar power generation system 100. FIG. 7(B) a diagram schematically showing an output voltage of the solar battery and voltages in the configuration example (2.3) of the solar power generation system 100. Compared with the DC/DC converter 20 of FIG. 6(A), a DC/DC converter 20A of the example has the same circuit configuration and has different parameters of the conversion of direct-current voltage. Besides, the DC/DC converter 20 is connected to a PCS 50A in this example instead of being connected to the inverter unit 30 in the example of FIG. 6(A). In the example, elements having the same function as the above-described solar power generation system 100 are denoted by the same symbols and the like, and repeated description is omitted.

In the example of FIG. 7(A), the DC/DC converter 20A is provided with a first conversion part 21 and a second conversion part 22. The first conversion part 21 makes the potential of the positive electrode in the solar battery 10 to be higher than the potential of the positive electrode of a power conditioner 50. In addition, the second conversion part 22 makes the potential of the negative electrode in the solar battery 10 to be higher than the potential of the negative electrode of a power conditioner (PCS) 50A.

In addition, the conversion device 42 of the example is configured separately from the PCS 50A, and supplies output power of the DC/DC converter 20A from external terminals 51, 52 on the direct-current side of the PCS 50A to the PCS 50A. Here, the conversion device 42 equalizes the output voltage V1 of the solar battery 10 and the output voltage V3 applied to the external terminals 51, 52 on the direct-current side of the PCS 50A. Therefore, when there is a solar power generation system 200 in which the performance degradation of the solar battery 10 caused by the PID is occurred when the output voltage V1 of the solar battery 10 is converted by the PCS 50A and is supplied to the commercial power system or the load as in the above-described FIG. 2(A), the performance degradation of the solar battery 10 caused by the PID can be prevented by connecting the conversion device 42 between the solar battery 10 and the PCS 50 and converting the potential between the positive electrode and the negative electrode in the solar battery 10. That is, the performance degradation of the solar battery 10 caused by the PID can be easily prevented by just adding the conversion device 42 to the existing solar power generation system.

In the example, as shown in FIG. 7(B), the first conversion part 21 commonly uses the negative electrode and steps down the output voltage V1 (for example, 284 V) of the solar battery 10 to the prescribed voltage V2 (for example, 124 V), and the second conversion part 22 commonly uses the positive electrode and steps up the voltage V2 to the voltage V3 (for example, 284 V) which is the same as the output of the solar battery 10. Then, the DC/DC converter 220 of the PCS 50A steps up the voltage V3 to the prescribed voltage V4 (for example, 320 V). In this case, as described above, the potential of the negative electrode on the output side in the DC/DC converter 220 is −160 V, and the potential of the positive electrode on the input side is +124 V. Thus, the potential of the positive electrode on the input side of the second conversion part 22 connected to the DC/DC converter 220 and commonly used is also +124 V. Therefore, by setting the output voltage of the first conversion part 21 to 124 V, the potential of the negative electrode is set to 0 V and the potential of the negative electrode in the solar battery 10 is set to 0 V to prevent the performance degradation of the solar battery 10 caused by the PID.

Furthermore, when the output voltage V1 of the solar battery 10 is smaller than the prescribed value in the peak point when the MPPT method is performed, the control part 40 stops the switching operation of the switching element S0, that is, the operation of the DC/DC converter 20. Here, the prescribed value refers to, for example, a value obtained by reducing one half (½) of the voltage V4 from the input voltage input to the inverter 31, that is, the output voltage V3 of the DC/DC converter 20. In the example of FIG. 7(B), as in the following formula, the prescribed value is 124 V.

Prescribed value=$V3-(V4/2)=284-(320/2)=124$ V

Accordingly, when the output voltage V1 of the solar battery 10 is low and the potential of the negative electrode of the solar battery 10 cannot be higher than the potential of the negative electrode on the output side of the DC/DC converter 20, the occurrence of the performance degradation caused by the PID can be prevented by stopping the operation of the DC/DC converter 20.

(2.4)

Figure 8:
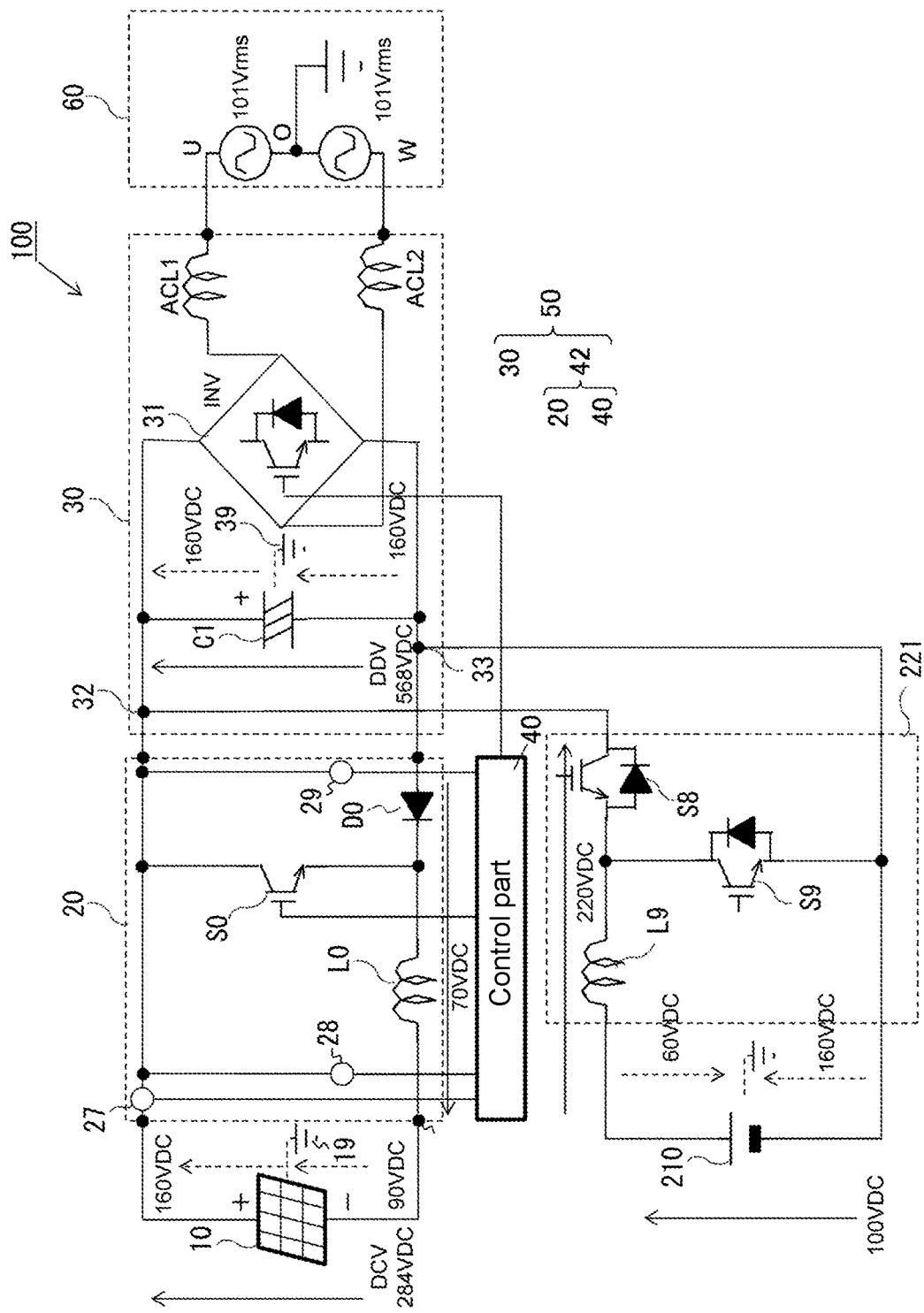
FIG. 8 is a drawing showing a configuration example (2.4) of the solar power generation system.
Figure 11:
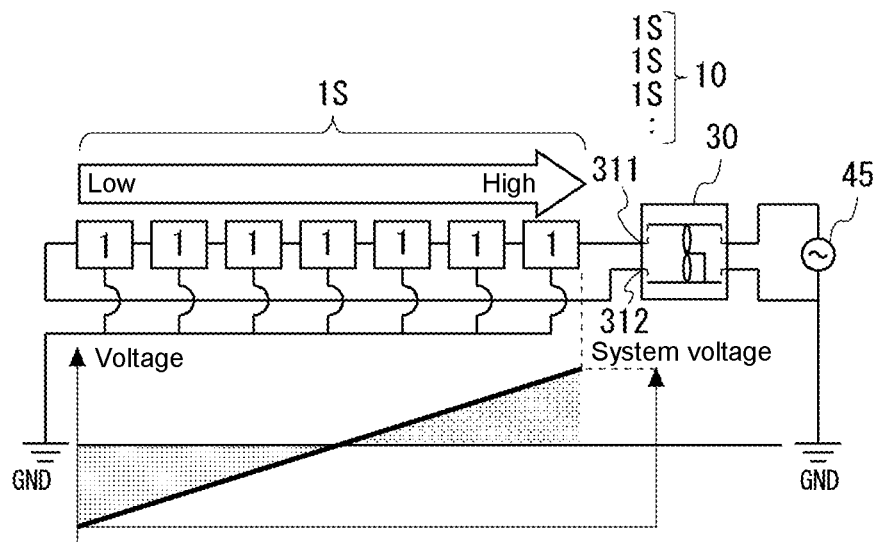
FIG. 11 is a conceptual diagram for describing an example of PID phenomenon.

FIG. 8 is a drawing showing a configuration example (2.4) of the solar power generation system. In FIG. 8, the solar power generation system 100 is a hybrid power system provided with a solar battery 10, a storage battery 210, DC/DC converters 20, 221, and an inverter unit 30. The storage battery 210 and the DC/DC converter 221 constitute a power storage device of the example. Besides, in the example, elements having the same function as the above-described solar power generation system 100 are denoted by the same symbols and the like, and repeated description is omitted.

The storage battery 210 is a secondary battery such as a lithium-ion battery, and accumulates the power supplied from the solar battery 10 or the commercial power system. In addition, the storage battery 210 discharges the accumulated power at night or when power is demanded and supplies the power to the load device.

The DC/DC converter 221 converts (steps up in the example) the power discharged from the storage battery 210 to a prescribed voltage and inputs the power to the inverter unit 30. In addition, the power supplied from the solar battery 10 or the commercial power system is input to the DC/DC converter 221 via the inverter unit 30, and the DC/DC converter 221 converts (steps down in the example) the power from the inverter unit 30 to a prescribed voltage and supplies the power to the storage battery 210 to charge the storage battery 210.

The inverter unit 30 is provided with the inverter 31 which converts the direct-current power input from the DC/DC converters 20, 221 to the alternating-current power and supplies the alternating-current power to the commercial power system or the load device, and converts the alternating-current power from the commercial power system to the direct-current power and supplies the direct-current power to the DC/DC converter 221. In addition, the inverter unit 30 is provided with an unillustrated system interconnection relay or the like, and controls the connection (system interconnection) to or the disconnection from the commercial power system.

By a switching operation of the switching element S2 according to a control signal from the control part 40, the DC/DC converter 20 steps up the direct-current voltage (for example, 284 V) input from the solar battery 10 to a prescribed voltage (for example, 568 V) and outputs the voltage to the inverter unit 30.

The DC/DC converter 221 connected to the storage battery 210 includes a reactor L9, and switching elements S8, S9 for step-up and step-down. In addition, a diode may be provided in anti-parallel to the switching elements S8, S9.

One end of the reactor L9 is connected the positive electrode of the storage battery 210, and the other end of the reactor L9 is connected to one end of the switching elements S8, S9.

The switching element S9 is connected in parallel to the storage battery 210. One end on the low potential side of the switching element S9 is connected to the negative electrode of the storage battery 210 and the negative electrode of the inverter unit 30, and one end on the high potential side of the switching element S9 is connected to the reactor L9 and the switching element S8.

One end of the switching element S8 is connected to the positive electrode of the inverter unit 30, and the other end of the switching element S8 is connected to the reactor L9 and a switching element S9.

By the switching operations of the switching elements S8, S9, the DC/DC converter 221 steps up the direct-current voltage (for example, 100 V) discharged from the storage battery 210 to a prescribed voltage (for example, 568 V) and outputs the voltage to the inverter unit 30, and steps down the direct-current voltage from the inverter unit 30 (for example, 568 V) to a prescribed voltage (for example, 100 V) and supplies the voltage to the storage battery 210 to charge the storage battery 210.

In the solar power generation system 100 of the example, when the solar battery 10 generates power in the daytime and the voltage V1 reaches an input prescribed value (for example, 568 V), as similar with the above-described configuration example, the potential in the negative electrode of the solar battery 10 is 0 V, and the performance degradation caused by the PID is prevented.

Then, when the output voltage V1 of the solar battery 10 is smaller than the prescribed value in the peak point when the MPPT method is performed, the control part 40 stops the switching operation of the switching element S0, that is, the operation of the DC/DC converter 20. Here, the prescribed value refers to, for example, one half (½) of the input voltage input to the inverter 31, that is, one half (½) of the output voltage V3 of the DC/DC converter 20, which is set to 284 V in the example of FIG. 8.

Accordingly, when the output voltage V1 of the solar battery 10 is low and the potential of the negative electrode of the solar battery 10 cannot be higher than the potential of the negative electrode on the output side of the DC/DC converter 20, the occurrence of the performance degradation caused by the PID can be prevented by stopping the operation of the DC/DC converter 20.

(2.5)

In the above-described configuration example, when the output voltage V1 of the solar battery 10 is smaller than the prescribed value in the peak point when the MPPT method is performed, the control part 40 stops the operation of the DC/DC converter 20, but it is not limited to hereto, and the operation of the DC/DC converter 20 may be stopped corresponding to a power value in the peak point.

The control part 40 controls in a manner that the control part 40 operates the DC/DC converter 20, detects the power value and voltage input from the solar battery by the input current detector 27 and the input voltage detector 28, controls the switching operation of the switching element S0 to change the voltage, obtains the peak point of the power value by, for example, a hill-climbing method and follows the peak point. Then, the operation of the DC/DC converter 20 is stopped when the power value in the peak point is smaller than the prescribed value.

Accordingly, when the output voltage V1 of the solar battery 10 is low and the potential of the negative electrode of the solar battery 10 cannot be higher than the potential of the negative electrode on the output side of the DC/DC converter 20, the occurrence of the performance degradation caused by the PID can be prevented by stopping the operation of the DC/DC converter 20.

(2.6)

In the above-described configuration example, when the output voltage V1 or the power value of the solar battery 10 is smaller than the prescribed value in the peak point when the MPPT control is performed, the control part 40 stops the operation of the DC/DC converter 20, but it is not limited to hereto, and the operation of the DC/DC converter 20 may also be stopped corresponding to the illumination.

FIG. 9(A) is a drawing showing a configuration example (2.6) of the solar power generation system. FIG. 9(B) a diagram schematically showing an output voltage of the solar battery and voltages in the configuration example (2.6) of the solar power generation system. In FIG. 9(A), the solar power generation system 100 is provided with an illuminometer 26.

The illuminometer 26 measures an illumination on the light-receiving surface of the solar battery 10. The output of the solar battery 10 is increased when the illumination on the light-receiving surface of the solar battery 10 is high, and the output of the solar battery 10 is reduced when the illumination is low. Therefore, an illumination is obtained in advance as a threshold, by which the output of the solar battery 10 is low and it is estimated that the potential of the negative electrode of the solar battery 10 cannot be higher than 0 V as in the above-described configuration example. Besides, the threshold of illumination may also be set corresponding to other information such as temperature, humidity or the like. For example, the PID occurs easily when the temperature or humidity is high, and thus the threshold of illumination may be set to be higher in a case that the temperature or humidity is high than a case that the temperature or humidity is low.

Then, the control part 40 monitors a measured value measured by the illuminometer 26 when the DC/DC converter 20 is operated, and stops the operation of the DC/DC converter 20 when the illumination is smaller than the threshold value.

Accordingly, when the illumination on the light-receiving surface of the solar battery 10 is low and it is estimated that the potential of the negative electrode of the solar battery 10 cannot be higher than the potential of the negative electrode on the output side of the DC/DC converter 20, the occurrence of the performance degradation caused by the PID can be prevented by stopping the operation of the DC/DC converter 20.

(2.7)

In the above-described configuration example (2.6), the operation of the DC/DC converter 20 is stopped corresponding to the illumination, but it is not limited hereto, the operation of the DC/DC converter 20 may also be stopped corresponding to weather.

FIG. 10(A) is a drawing showing a configuration example (2.7) of the solar power generation system. FIG. 10(B) a diagram schematically showing an output voltage of the solar battery and voltages in the configuration example (2.7) of the solar power generation system. In FIG. 10(A), the solar power generation system 100 is provided with a communication module 25.

The communication module 25 is a module for communicating with other devices via a radio communication line or a network such as an internet. The control part 40 is connected to an external server via the communication module 25, transmits identification information of the solar power generation system 100 and requests weather information. The external server receiving the request transmits the weather information that indicates the weather of a region specified by the identification information to the control part 40 of the solar power generation system 100. The weather information is, for example, sunny, cloudy, rainy, snowy and so on. In addition, the weather information may also be sunny, slightly cloudy, overcast, highly-cloudy, rainy, snowy and so on.

The output of the solar battery 10 is high when the weather is sunny or slightly cloudy, and the output of the solar battery 10 is low when the weather is rainy or snowy. Therefore, the weather condition, under which the output of the solar battery 10 is low and it is estimated that the potential of the negative electrode of the solar battery 10 cannot be higher than 0 V as in the above-described configuration example, is obtained in advance. Besides, the weather condition may also be set corresponding to other information such as time, temperature, humidity or the like. For example, a time zone in which it is estimated that the potential of the negative electrode of the solar battery 10 cannot be higher than 0 V may be set differently for each weather in a manner that the time zone is from the sunset time to 30 minutes after the sunrise time on a sunny day and from the sunset time to 1 hour after the sunrise time on a cloudy day. Furthermore, the PID occurs easily when the temperature or humidity is high, and thus the time zone may be set to be longer in the case that the temperature or humidity is high than the case that the temperature or humidity is low.

Then, the control part 40 regularly acquires the weather information when the DC/DC converter 20 is operated, and stops the operation of the DC/DC converter 20 when the weather information or the like meets the above weather conditions.

Accordingly, when the weather is bad and it is estimated that the potential of the negative electrode of the solar battery 10 cannot be higher than the potential of the negative electrode on the output side of the DC/DC converter, the occurrence of the performance degradation caused by the PID can be prevented by stopping the operation of the DC/DC converter 20.

§ 3 Embodiment

The conversion device (42) of one example of the disclosure includes: a DC/DC converter (20), in which a solar battery is connected to an input end, wherein when direct-current power generated by the solar battery is converted and output, the DC/DC converter (20) makes a potential of a negative electrode of the solar battery higher than a potential in a negative electrode of the output when the power input from the solar battery exceeds a prescribed value; and a control part (40), which changes a voltage of the power output from the solar battery to detect a peak value of the power, and stops the operation of the DC/DC converter when the peak value is smaller than the prescribed value.

In addition, the conversion device (42) of one example of the disclosure includes: a DC/DC converter (20), in which a solar battery is connected to an input end, wherein when direct-current power generated by the solar battery is converted and output, the DC/DC converter (20) makes a potential of a negative electrode of the solar battery higher than a potential in a negative electrode of the output when a voltage of the power input from the solar battery exceeds a prescribed value; and a control part (40), which changes the voltage of the power output from the solar battery to detect a peak point of the power, and stops the operation of the DC/DC converter when the voltage at the peak point is smaller than the prescribed value.

In addition, the conversion device (42) of one example of the disclosure includes: a DC/DC converter (20), in which a solar battery is connected to an input end, wherein when direct-current power generated by the solar battery is converted and output, the DC/DC converter (20) makes a potential of a negative electrode of the solar battery higher than a potential in a negative electrode of the inverter when the power input from the solar battery exceeds a prescribed value; and a control part (40), which acquires information indicating weather or illumination and stops the operation of the DC/DC converter when the power from the solar battery estimated based on the information is smaller than the prescribed value.

The above-described embodiments and variations of the present disclosure are only illustrative, and the present disclosure is not limited hereto. In addition, characteristic configurations shown in the above-described embodiments and variations can certainly be combined in the scope not departing from the spirit of the present disclosure.

What is claimed is:

1. A conversion device, comprising:
a DC/DC converter, in which a solar battery is connected to an input end of the DC/DC converter, wherein when direct-current power generated by the solar battery is converted and output, the DC/DC converter makes a potential of a negative electrode of the solar battery to be higher than a potential in a negative electrode of an output of the DC/DC converter when the power input from the solar battery exceeds a prescribed value; and
a control part, wherein when the voltage of a power output from the solar battery changes, the control part detects a peak value of the power and stops the operation of the DC/DC converter when the peak value is smaller than the prescribed value.

2. A conversion device, comprising:
a DC/DC converter, in which a solar battery is connected to an input end of the DC/DC converter, wherein when direct-current power generated by the solar battery is converted and output, the DC/DC converter makes a potential of a negative electrode of the solar battery to be higher than a potential in a negative electrode of an output of the DC/DC converter when a voltage of the power input from the solar battery exceeds a prescribed value; and
a control part, wherein when the voltage of a power output from the solar battery changes, the control part detects a peak point of the power and stops the operation of the DC/DC converter when the voltage at the peak point is smaller than the prescribed value.

3. A conversion device, comprising:
a DC/DC converter, in which a solar battery is connected to an input end of the DC/DC converter, wherein when direct-current power generated by the solar battery is converted and output, the DC/DC converter makes a potential of a negative electrode of the solar battery to be higher than a potential in a negative electrode of an output of the DC/DC converter when the power input from the solar battery exceeds a prescribed value;
a control part, which acquires information indicating weather or illumination and stops the operation of the DC/DC converter when the power from the solar battery estimated based on the information is smaller than the prescribed value.

4. A hybrid power supply system comprising:
a solar battery;
a conversion device according to claim 1, which is connected to the solar battery; and
a power storage device comprising a storage battery connected to an output of the conversion device.

5. A hybrid power supply system comprising:
a solar battery;
a conversion device according to claim 2, which is connected to the solar battery; and
a power storage device comprising a storage battery connected to an output of the conversion device.

6. A hybrid power supply system comprising:
a solar battery;
a conversion device according to claim 3, which is connected to the solar battery; and
a power storage device comprising a storage battery connected to an output of the conversion device.

* * * * *